(No Model.)

D. L. TICE.
EYEGLASSES.

No. 292,073. Patented Jan. 15, 1884.

WITNESSES
F. L. Durand
E. G. Siggers

INVENTOR
Dudley L. Tice,
by J. A. Snow & Co
Attorneys

UNITED STATES PATENT OFFICE.

DUDLEY L. TICE, OF READING, PENNSYLVANIA.

EYEGLASSES.

SPECIFICATION forming part of Letters Patent No. 292,078, dated January 15, 1884.

Application filed December 5, 1883. (No model.)

*To all whom it may concern:*

Be it known that I, DUDLEY L. TICE, a citizen of the United States, residing at Reading, in the county of Berks and State of Pennsylvania, have invented new and useful Eyeglasses, of which the following is a specification, reference being had to the accompanying drawings.

This invention relates to eyeglasses, and it has for its object to provide means for preventing the strain upon the spring-bow, so that all danger of breaking the latter will be obviated. A further object of the invention provides for the ready and efficient attachment of the handle.

With these objects in view the said invention consists in certain details of construction and combination of parts, as hereinafter fully set forth, and particularly pointed out in the claims.

Figure 1:
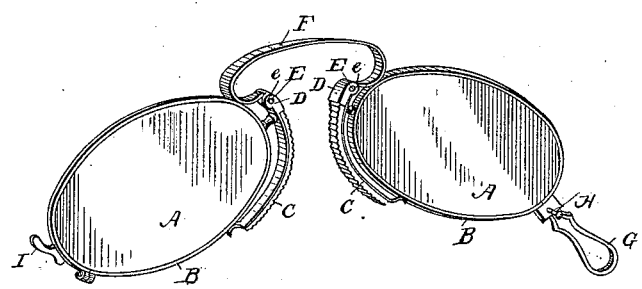
Figure 2:
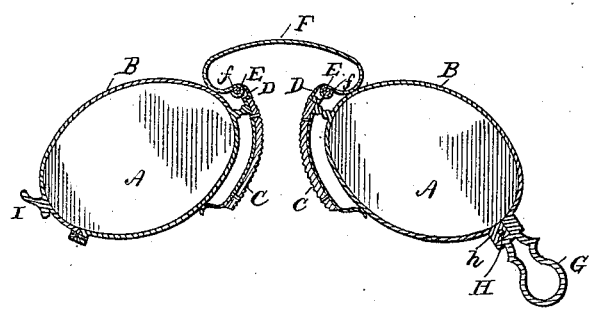
Figure 3:
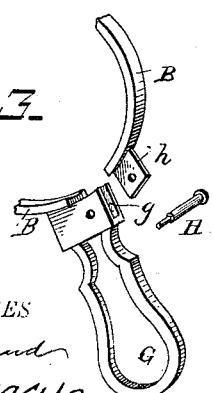
Figure 4:
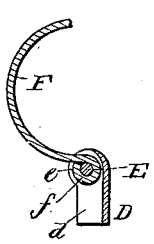

In the accompanying drawings, Figure 1 is a perspective view of a pair of eyeglasses embodying my improvements. Fig. 2 is a longitudinal sectional view of the same. Fig. 3 is a detail view of the parts of the handle, and Fig. 4 illustrates the attachment of the spring-bow.

Like letters of reference indicate corresponding parts in the several figures.

Referring to the drawings, A designates the lenses or eyeglasses, provided with or without the inclosing-frames B, the nose-pieces C being attached to the said frames in any ordinary manner. To the upper ends of the nose-pieces are attached castings or plates D, the sides $d$ of which clasp or fit around the sides of the nose-pieces, and are soldered or otherwise secured thereto. The upper ends of the castings or plates D are formed with inwardly-extending lugs $e$ on each side, a rod, E, extending across and connecting the lugs, and the spring-bow F being formed at its ends with journals $f$, working around the rod E, so that when the eyeglasses are being opened or closed the journals of the bow will freely work to take the strain that would otherwise rest on the said bow.

G designates the handle, the upper end of which is slotted or bifurcated, as at $g$, an extension, $h$, of the eyeglass-frame B fitting in this slot, and secured in place by the upwardly-projecting stop or pin H, the handle being thereby held in a secure and simple manner. The catch I is attached to the other eyeglass-frame, and is adapted to engage with the pin or stop H to hold the eyeglasses together in the usual manner.

From the foregoing description, taken in connection with the annexed drawings, the operation and advantages of my invention will be readily understood. When the eyeglasses are extended, the spring-bow will turn on its journals, so as to cause the ends of the said bow to rest on the frames B, and thus the eyeglasses will be easy to the wearer's nose. In closing the glasses the bow will work on its journals until it is stopped by the front part of the plates D, thereby relieving the said bow from being strained by the closing of the glasses. It will thus be seen that the spring-bow will not be strained either by the closing or opening of the eyeglasses, so that it will be impossible to break the said bow from these causes.

The above-described construction of handle permits the ready, efficient, and secure attachment of the same to the frames B; and thus I attain an important advantage over the ordinary construction.

It will be apparent that various modifications may be resorted to without departing from the spirit or scope of my invention.

It will also be seen that the devices employed are simple, inexpensive, and durable, and will add very much to the comfort and efficiency of eyeglasses.

Having described my invention, I claim—

1. As an improvement in eyeglasses, the handle, slotted or bifurcated at its upper end, in combination with the eyeglass-frames formed with an extension fitting in the slotted end of the handle, and an upwardly-projecting pin or stop connecting the parts, as and for the purpose set forth.

2. In eyeglasses, the combination, with the nose-pieces and eyeglass-frames, of plates secured to the upper ends of the nose-pieces, and the bow pivoted at its ends to the said plates, as set forth.

3. In eyeglasses, the combination, with the nose-pieces and eyeglass-frames, of plates secured to the upper ends of the nose-pieces, a rod extending across and within the plates, and the bow pivoted at its ends to said rod, as and for the purpose set forth.

4. As an improvement in eyeglasses, the combination, with the nose-pieces and eyeglass-frames, of plates secured to the upper ends of the nose-pieces and formed with lugs $e$, a rod extending across and connecting the lugs, and the bow pivoted at its ends to said rod, as and for the purpose set forth.

In testimony that I claim the foregoing as my own I have hereto affixed my signature in presence of two witnesses.

DUDLEY L. TICE.

Witnesses:
SOLOMON L. DE HART,
WILLIAM A. H. SCHMEHL.